(12) United States Patent
Dobrean et al.

(10) Patent No.: US 10,423,583 B1
(45) Date of Patent: Sep. 24, 2019

(54) EFFICIENT CACHING AND CONFIGURATION FOR RETRIEVING DATA FROM A STORAGE SYSTEM

(71) Applicant: EMC IP Holding Company LLC, Hopkinton, MA (US)

(72) Inventors: Adrian Dobrean, Oakville (CA); Dorota Zak, Mississauga (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 318 days.

(21) Appl. No.: 15/391,139

(22) Filed: Dec. 27, 2016

(51) Int. Cl.
| | |
|---|---|
| *G06F 7/00* | (2006.01) |
| *G06F 17/00* | (2019.01) |
| *G06F 16/174* | (2019.01) |
| *G06F 12/0875* | (2016.01) |
| *G06F 16/27* | (2019.01) |
| *G06F 16/22* | (2019.01) |
| *G06F 16/2455* | (2019.01) |

(52) U.S. Cl.
CPC ...... *G06F 16/1748* (2019.01); *G06F 12/0875* (2013.01); *G06F 16/2246* (2019.01); *G06F 16/2455* (2019.01); *G06F 16/24552* (2019.01); *G06F 16/27* (2019.01); *G06F 2212/45* (2013.01)

(58) Field of Classification Search
None
See application file for complete search history.

(56) References Cited

U.S. PATENT DOCUMENTS

| | | | | |
|---|---|---|---|---|
| 2008/0270548 | A1* | 10/2008 | Glickstein | G06Q 10/107 709/206 |
| 2012/0166757 | A1* | 6/2012 | Volvovski | G06F 11/1076 711/206 |
| 2014/0032590 | A1* | 1/2014 | Sinclair | G06F 16/24552 707/769 |
| 2014/0164551 | A1* | 6/2014 | Resch | G06F 11/1092 709/213 |
| 2015/0379143 | A1* | 12/2015 | Niu | G06F 3/0482 707/710 |
| 2016/0196633 | A1* | 7/2016 | Charles | G06F 12/128 345/501 |
| 2018/0173767 | A1* | 6/2018 | Langseth | G06F 16/24561 |

* cited by examiner

*Primary Examiner* — Tuan A Pham
(74) *Attorney, Agent, or Firm* — Womble Bond Dickingson (US) LLP

(57) ABSTRACT

Described is a system and method that provides a mechanism for retrieving data from a storage system using one or more techniques. These techniques may be used in a storage configuration that stores backup or recovery data that may be retrieved by an application agent (e.g. intermediary service) in response to a query from a first device (e.g. client device). When data is stored as backup or recovery data, configurations often employ more cost effective (e.g. lower performance) storage solutions. Accordingly, in order to improve retrieval performance, the system may efficiently cache data. For example, the system may store search data from previous queries in a cache associated with the application agent (e.g. local storage) such that subsequent queries may be fulfilled, at least partially, by searching the cached search data instead of the data residing on the remote backup or recovery storage system.

20 Claims, 6 Drawing Sheets

EFFICIENT CACHING AND CONFIGURATION FOR RETRIEVING DATA FROM A STORAGE SYSTEM

TECHNICAL FIELD

Embodiments of the present disclosure generally relate to data storage systems. More particularly, embodiments of the disclosure relate to a system that provides an efficient mechanism for retrieval of data from a remote storage system.

BACKGROUND

Data backup and recovery systems often implement various techniques to increase performance and improve overall cost of implementations. For example, these systems often employ data de-duplication services for disk backup, archiving, and disaster recovery. When providing such services, these systems often use various applications to store, for example, databases and applications directly to a storage device. In addition, these services may be employed in various configuration environments such as a remote server architecture or a directly attached storage device.

In a remote server environment, applications often backup or recovery multiple client devices within a networked environment (e.g. "cloud"). However, because these applications do not reside on the storage server, they often incur various performance limitations. For example, in such an environment, the applications may suffer from limitations regarding the amount of data queries the application is capable of handling. For instance, because the application is remote from the storage device (e.g. connected via a public network such as the internet), applications must process each query by searching data that is stored remotely on the storage device. Accordingly, when applications perform a significant number of queries, the overall device performance of the remote storage device may degrade significantly. Accordingly, there is a need to improve the ability for an application to handle queries for data stored on a remote storage device.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "some embodiments," "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

According to some embodiments, described is a system (and method) that provides a mechanism for retrieving data from a storage system using one or more techniques. In one embodiment, these techniques may be used in a storage configuration that stores backup or recovery data that may be retrieved by an application agent (e.g. intermediary cloud-based service) in response to a query from a first device (e.g. client device). When data is stored as backup or recovery data, configurations often employ more cost effective (e.g. lower performance) storage solutions. Accordingly, in order to improve the retrieval performance, the system may efficiently cache search data that is used to retrieve data in response to a query. For example, the application agent may store search data from previous queries in a cache associated with the application agent (e.g. local storage) such that subsequent queries may be fulfilled, at least partially, by searching the cached search data instead of the data residing on the remote backup or recovery storage system. The search data may include metadata and other information that may be separate from, or part of, the metadata such as directory subspace information, directory tag information, mapping tables, indexes, etc.

As another technique, the system in some embodiments may store information using an efficient directory structure. For example, storage systems typically store metadata together with its corresponding data files. In one embodiment, the storage system may store data and its associated metadata in separate directory trees. Accordingly, when performing a search in response to a query, only the necessary metadata or data files required to fulfil the query may need to be accessed. As further described herein, these and additional techniques may be provided within a configuration as shown in FIG. 1.

Figure 1:
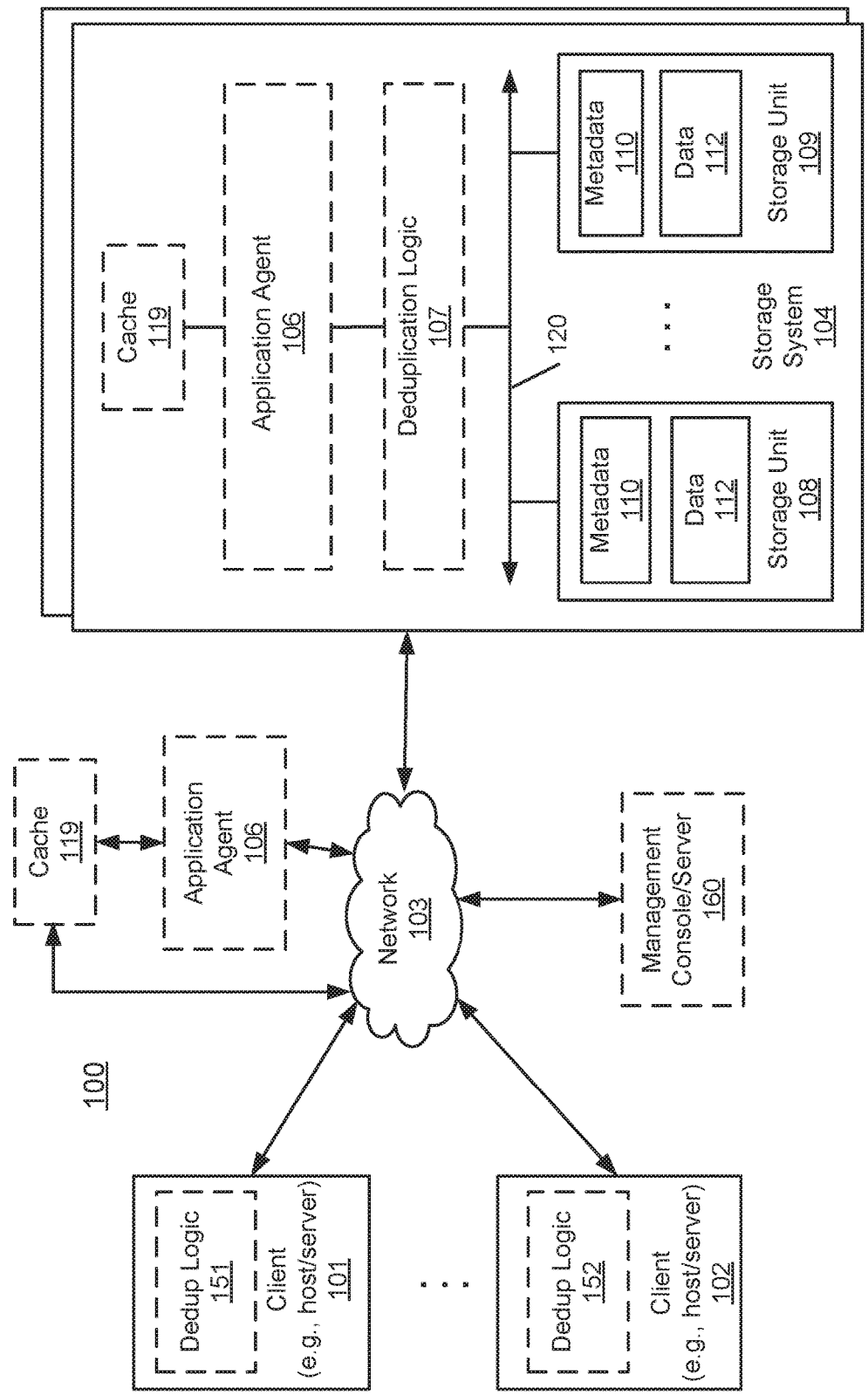
FIG. 1 is a block diagram illustrating a system configuration according to one embodiment of the disclosure.

FIG. 1 is a block diagram illustrating a system configuration according to one embodiment of the disclosure. Referring to FIG. 1, configuration 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of server or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. For example, the file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, solid state drive (SSD), a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109.

The metadata, such as metadata 110, may be stored in at least some of storage units 108-109, such that files can be accessed independent of another storage unit. Metadata of each storage unit includes enough information to provide access to the files it contains. As referred to herein, metadata 110 includes data associated with various attributes of the file, such as index information, file name/identifier, file location, file length, date stamp, permission, whether a file has been removed from the current file system, whether a file has been renamed, etc. For example, when performing a search for data as further described herein, the system may access the metadata 110 to identify and locate the requested data (e.g. requested via a query).

In one embodiment, metadata may include fingerprints contained within data 112, where, for example, data 112 represents a data segment, a compression region (CR) of data segments, or a container of one or more CRs. Fingerprints are mapped to a particular data 112 via metadata 110, enabling the system to identify the location of the data 112 containing a segment represented by a particular fingerprint. For example, when an active storage unit fails, metadata 110 contained in another storage unit may be utilized to recover the active storage unit.

In one embodiment, the metadata 110 may include reconstruction information for the data 112 (or data files) that may be segmented. In one embodiment, a copy of the metadata 110 is stored for files stored on a first storage unit (e.g. storage unit 108) so that files that are stored on the storage unit can be accessed using only the information stored on the storage unit. In one embodiment, metadata 110 can be reconstructed by using information of other storage units associated with the storage system in the event that the main metadata 110 is lost, corrupted, damaged, etc. For example, metadata 110 for storage units (e.g. storage unit 108) may be reconstructed using metadata information stored on another storage unit (e.g. storage unit 109) or other type of storage unit (e.g. replica storage unit).

In one embodiment, storage system 104 includes, but is not limited to, application agent 106, which may be a system as further described herein (or may include service logic, service module, or service unit, which may be implemented in software, hardware, or a combination thereof), optional deduplication logic 107, and one or more storage units or devices 108-109 communicatively coupled to each other.

Application agent 106 may represent any storage service related components configured or adapted to provide storage services to a variety of clients using any of the techniques described herein. As shown, in one embodiment, the application agent 106 may reside on a separate server (e.g. as a cloud-based service) from the client devices 101/102 or storage system 104. In addition, as shown, in another embodiment, the application agent 106 may be part of storage system 104, or may be part of client device 101/102 (not shown).

The application agent 106 may perform various services such as, for example, a query service, a backup service, and restore service. Query service may be configured to receive a query from a client device (e.g. client device 101-102), and in response, initiate a search for data within the storage system 104. In one embodiment, a search may be performed by accessing search data. In one embodiment, the search data may include metadata 110 to identify and locate information (e.g. data 112) requested by client device via the query. Backup service may be configured to receive and back up data from a client (e.g. clients 101-102) and to store the backup data in any one or more of storage units 108-109. Restore service may be configured to retrieve and restore backup data from any one or more of storage units 108-109 back to a client (e.g. clients 101-102). In one embodiment, the restore service may work in conjunction with the query service to identify and locate data that is to be restored. As referred to herein, a service may include one or more processing modules (or logic, units, component, etc.), which may be implemented in software, hardware, or a combination thereof.

As shown, the application agent 106 may be associated with a cache 119. The cache may include any suitable memory or storage (e.g. as shown in system 1500) to provide a mechanism for improved search performance (e.g. access speed) over, for example, storage units 108-109 that may store search data remotely and/or in a lower performance storage device. In one embodiment, the cache 119 may be local memory or storage (e.g. reside on the same server, system, or device as the application agent 106).

Referring back to FIG. 1, in one embodiment, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104. For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to storage system 104 indicating that the segment has not been stored in storage system 104, that particular segment is then transmitted over to the storage system 104. As a result, the network traffic or bandwidth and the processing resources required can be greatly reduced.

Accordingly, a goal of deduplication logic 107 is to maintain only a single copy of each unique set of data within a data set. To achieve that goal, in one embodiment, deduplication logic 107 may compute digests for data blocks. A digest is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table in order to process data blocks within the data set for deduplication. Further, a deduplication key identifying a data block is also stored in index table along with the digest for the data block.

A deduplication key uniquely identifies a data block by storing information (such as logical address, physical address) of the data block. Deduplication logic 107 identifies data blocks that can potentially be deduplicated by comparing digests of data blocks with list of digests stored in the index table. Further, when data blocks are deduplicated after comparing digest information, deduplication logic 107 updates metadata (e.g. metadata 110) of deduplicated data blocks. Additionally, deduplication logic 107 updates metadata of a data block when the data block is reduplicated.

Accordingly, the various deduplication techniques described above may be considered when retrieving data in response to a query as further described herein. For example, when retrieving requested data, the system may consider whether such information has been updated since a last recovery or backup, and therefore, further reduce the amount of data required to be transferred when fulfilling a request.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

It should be noted that some or all of the components as shown and described above (e.g. of FIG. 1) may be implemented in software, hardware, or a combination thereof. For example, such components can be implemented as software installed and stored in a persistent storage device, which can be loaded and executed in a memory by a processor (not shown) to carry out the processes or methods described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 2:
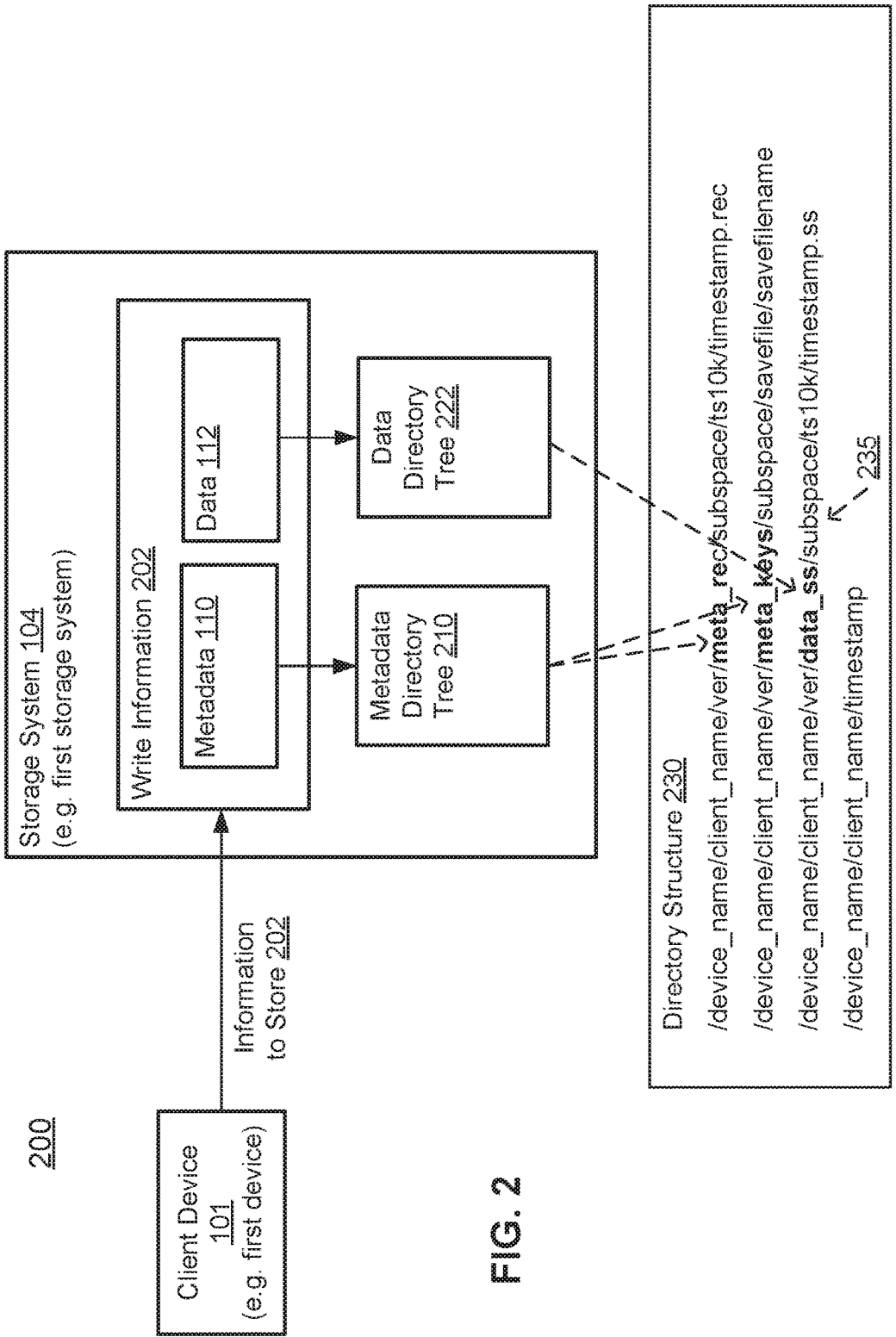
FIG. 2 is a block diagram illustrating an example configuration of storing information on a storage system according to one embodiment of the disclosure.

FIG. 2 is a block diagram illustrating an example configuration of storing information on a storage system 104 according to one embodiment of the disclosure.

As shown, a client device 101 may provide information 202 to a storage system 104, which may write the information 202 to one or more storage units (e.g. storage unit 108/109). For example, a backup application may provide this information 202 for the storage system 104 to store as a redundant copy for disaster recovery purposes. As described above, when the storage system 104 writes the information, it may be stored as data 112 along with its associated metadata 110.

In one embodiment, the storage system 104 may implement an efficient directory structure 230 when storing files (e.g. database files). For example, the storage system 104 may store the data 112 in a separate directory tree from its associated metadata 110. As shown, the directory structure 230 may include a subdirectory for metadata 110 such as a subdirectory for metadata records (e.g. "meta_rec,") and keys (e.g. "meta_keys"). In one embodiment, one or more subdirectories for metadata 110 may only (e.g. exclusively) store metadata files.

Similarly, as shown, the directory structure 230 may also include a subdirectory for data 112 such as a subdirectory for data records (e.g. "data_ss"). In one embodiment, one or more subdirectories for data 112 may only (e.g. exclusively) store data files.

As described above, the metadata 110 may be part of the search data used to retrieve data 112 in response to a query. In one embodiment, the search data may also include subspace name information. As shown, the directory structure 230 may implement the use of subspaces 235. Accordingly, metadata 110 may be grouped based on a subspace name. For example, a particular subspace directory (e.g. "subspace") may be provided within the appropriate directory tree (e.g. metadata or data directory). In one embodiment, the metadata and data files may be associated based on being stored in a storage location that includes a common subspace name within their respective directory trees. In addition, the subspace name may be created when data 112 is stored to the storage system 104. In one embodiment, the subspace name may be defined by an application that stores the information (e.g. backup or recovery service application).

These subspaces 325 may be organized using various criteria such as application type, data type, time, etc. As shown in this example, the subspaces 235 may be organized using a timestamp (e.g. timestamp "tk10k") based on, for example, when the data (e.g. a data record) is written. In addition, to further increase lookup performance, the system may use various indexing or mapping tables to track the subspaces 235. For example, in response to a query and/or an update to the stored data, one or more mapping tables or indexes may be updated. In addition, in one embodiment, the subspaces may be linked to other information such as the timestamp of the records as described above. In some embodiments, when search data (e.g. metadata) is added to the cache, a corresponding record may also be added to the subspace mapping table. Accordingly, the system may search either the metadata (e.g. attributes) or the associated subspace using a joined table mechanism.

By structuring the metadata 110 separately from the data 112, the system may efficiently search within the appropriate type of file. For example, when performing a search for data 112, only the necessary search data (e.g. metadata 110 files) may need to be accessed to locate and identify the searched for data 112 to fulfil a request. For example, as described above, the metadata 110 may provide information regarding the identity, location, last update, etc. for its corresponding data 112.

In one embodiment, the storage system 104 may provide a tagging mechanism to aid the system in identifying relevant directories during a search. For example, the storage system 104 may include a version subdirectory (e.g. "ver") that may be tagged and indexed. Accordingly, in response to a request for a particular set of data 112, the system may refer to the appropriate version tag to identify the appropriate directory (e.g. metadata or data directory). Accordingly, in one embodiment, the search data may also include this tag information.

Figure 3:
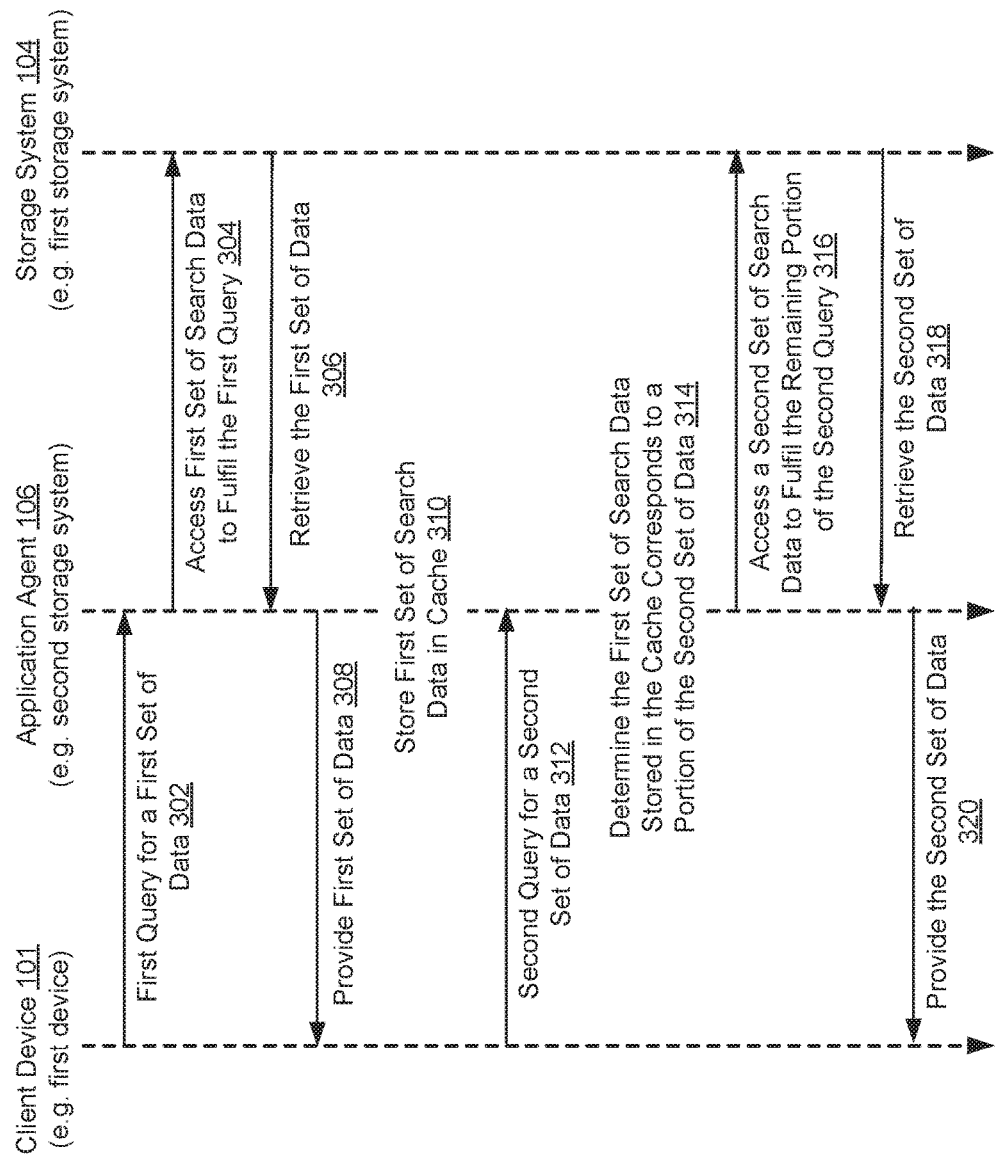
FIG. 3 is a block diagram illustrating an example process flow of fulfilling a query based on performing a search of data at least partially stored in a cache according to one embodiment of the disclosure.

FIG. 3 is a block diagram illustrating an example process flow of fulfilling a query based on performing a search of data at least partially stored in a cache according to one embodiment of the disclosure. As shown, a client device 101 (e.g. first device) may provide a first query for a first set of data 302 to an application agent 106 (e.g. second storage system). For example, the first query may be provided as part of a request to retrieve data (e.g. data 112) for an application of the client device 101. In response to the first query, the application agent 106 may access a first set of search data stored on the storage system 104 to fulfil the first query 304. As described above, the search data may include metadata (e.g. metadata 110), as well as any other information such as tag information, subspace information, mapping tables, indexes, etc., which may be part of, or separate from the metadata.

In one embodiment, the application agent 106 may perform the search or coordinate with the storage system 104 (e.g. first storage system) that may also perform the search. Once a search is performed and the requested data is identified, the application agent 106 may retrieve the first set of data 306. Accordingly, application agent 106 may provide the retrieved first set of data 308 to the client device 101. In addition, the application agent 106 may store the first set of search data in a cache 310.

As described above, the first set of search data may be stored in a local cache (or storage device) in order to improve the performance of accessing the same data in response to future queries. For example, as shown, client device 101 may provide a second query for a second set of data 312. Accordingly, in instances where the second set of data may be searched (e.g. identified and/or located) from the search data at least partially stored in the cache, the application agent 106 may determine the first set of search data stored in the cache corresponds to a portion of the second set of data 314. When not all of the second set of data may be searched from data already in the cache, the application agent 106 may access a second set of search data stored on the storage system 104 to fulfil the remaining portion of the second query 312. This search may be performed in a similar manner to the search to fulfill the first query 304. Once a search is performed and the remaining data is identified, the application agent 106 may retrieve the second set of data 318. Accordingly, the application agent 106 may provide the second set of data 320 to the client device 101. Thus, in one embodiment, the application agent 106 accesses both the search data stored in the cache and the search data stored on the storage system 104. Accordingly, the application agent 106 may improve overall performance in response to data queries as a least a portion of the search data may be retrieved from a local cache.

Figure 4:
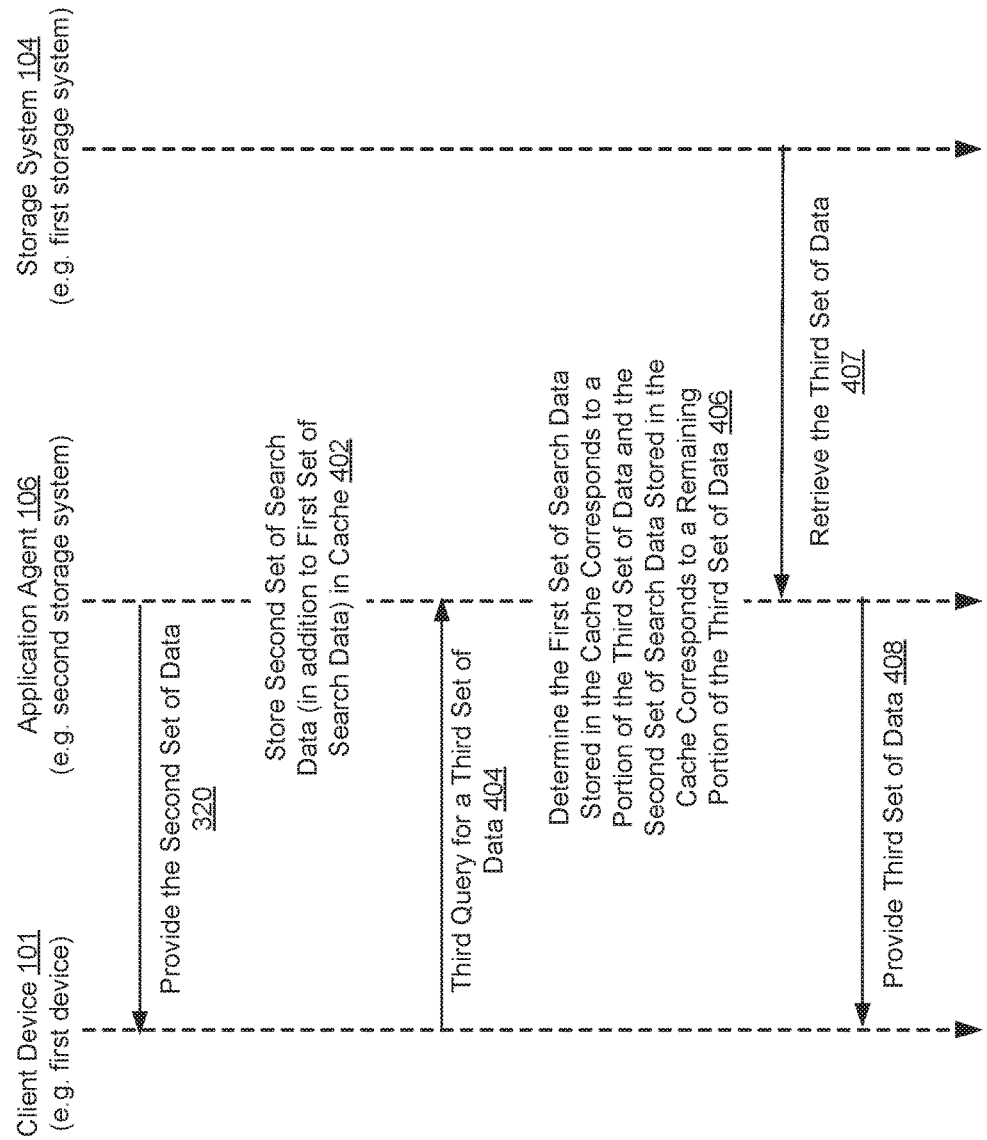
FIG. 4 is a block diagram illustrating an example process flow of fulfilling a query based on performing a search of data fully stored in a cache according to one embodiment of the disclosure

FIG. 4 is a block diagram illustrating an example process flow of fulfilling a query based on performing a search of data fully stored in a cache according to one embodiment of the disclosure. As shown in FIG. 4, in one embodiment, the application agent 106 may perform a search based exclusively on data stored in the cache in response to a query. As described above, the application agent 106 may provide to the client device 101 the second set of data retrieved from the storage system 320. Accordingly, the application agent 106 may store the second set of search data in the cache 402. As described above, in one embodiment, the second set of search data may include metadata (e.g. metadata 110). Thus, the application agent 106 may progressively store search data to the cache (e.g. add the second set of search data to the first set of search data already stored in the cache).

As shown, the client device 101 may provide a third query for a third set of data 404. Accordingly, in instances where the third data may be searched (e.g. identified and/or located) from the search data already stored in the cache, the application agent 106 may determine the first set of search data stored in the cache corresponds to a portion of the third set of data and the second set of search data stored in the cache corresponds to a remaining portion of the third set of data 406. Accordingly, the necessary search data required to fulfil the request may be accessed entirely from the cache. For example, as shown in FIG. 4, it is not necessary for the application agent 106 to access any search data directly from storage system 104. Thus, the application agent 106 may retrieve the third set of data 407 from the storage system 104 based on accessing search data exclusively stored in the cache. Accordingly, the application agent may provide the third set of data 408 to the client device 101.

Figure 5:
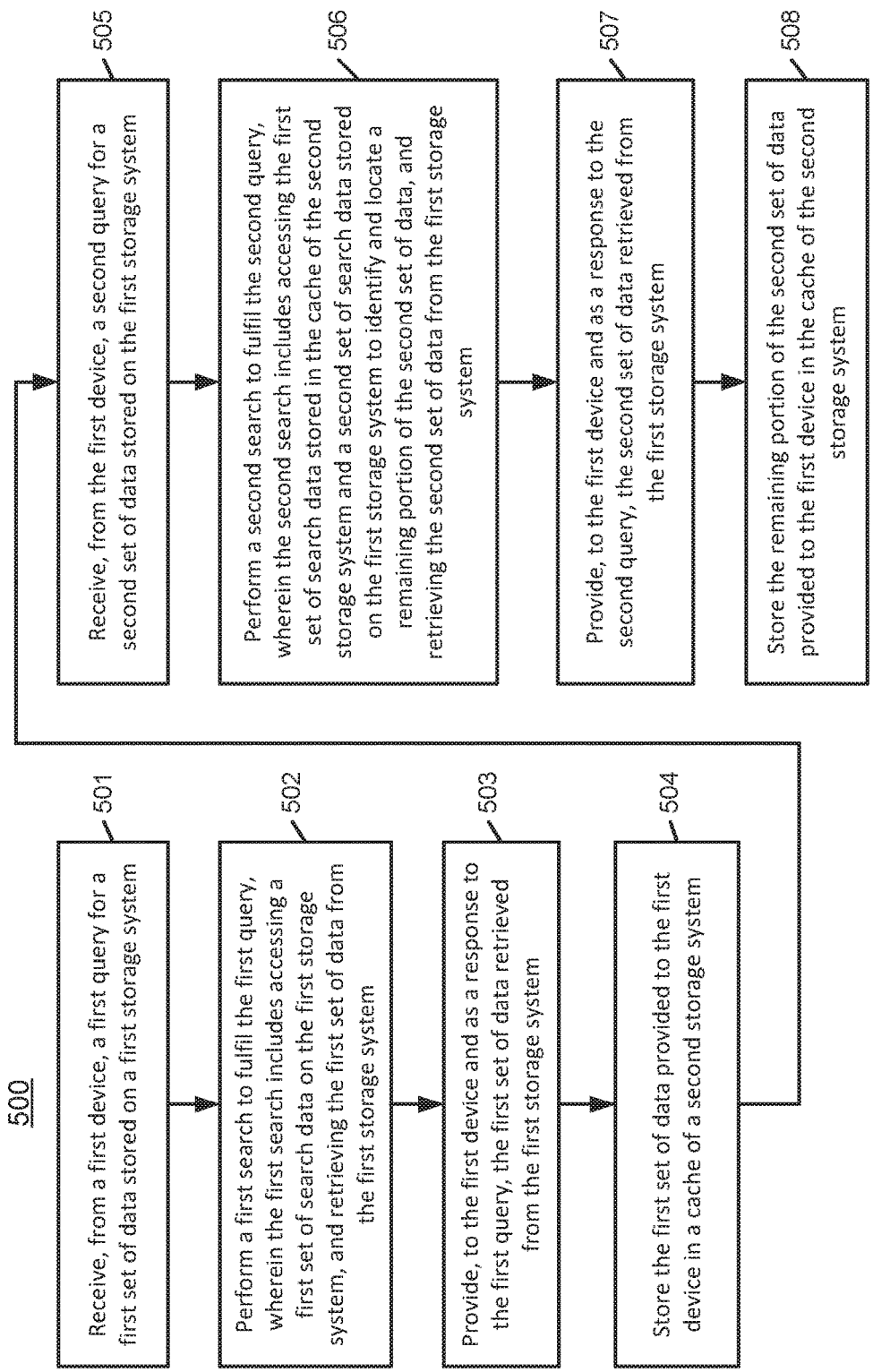
FIG. 5 is a block diagram illustrating an example method for retrieving data in response to a data query according to one embodiment of the disclosure.

FIG. 5 is a block diagram illustrating an example method for retrieving data in response to a data query according to one embodiment of the disclosure. Method 500 may be performed by a system (e.g. system 100, or one or more components to form a system such as application agent 106, storage system 104, or client device 101/102).

In 501, the system may receive, from a first device (e.g. client device 101/102), a first query for a first set of data (e.g. data 112) stored on a first storage system (e.g. storage system 104). In 502, the system may perform a first search to fulfil the first query, wherein the first search includes accessing a first set of search data on the first storage system to identify and locate the first set of data. In one embodiment, the search data may include metadata (e.g. metadata 110). In addition, the system may retrieve the first set of data from the first storage system. In 503, the system may provide, to the first device and as a response to the first query, the first set of data retrieved from the first storage system. In 504, the system may store the first set of data provided to the first device in a cache of a second storage system. In 505, the system may receive, from the first device, a second query for a second set of data stored on the first storage system.

In 506, the system may perform a second search to fulfil the second query. In one embodiment, the second search may include accessing the first set of search data stored in the cache of the second storage system to identify and locate a portion of the second set of data, accessing a second set of search data stored on the first storage system to identify and locate a remaining portion of the second set of data, and retrieving the second set of data from the first storage system. In 507, the system may provide, to the first device and as a response to the second query, the portion of the first set of data retrieved from the cache of the second storage system, and the remaining portion of the second set of data retrieved from the first storage system. In 508, the system may store the remaining portion of the second set of data provided to the first device in the cache of the second storage system.

In one embodiment, the system may further receive, from the first device, a third query for a third set of data stored on the first storage system. Accordingly, the system may perform a third search to fulfil the third query. In one embodiment, the third search may include accessing the first set of search data stored in the cache of the second storage system to identify and locate a portion of the third set of data, accessing the second set of search data stored on the first storage system to identify and locate a remaining portion of the third set of data, and retrieving the third set of data from the first storage system. In one embodiment, the third query may be fulfilled without accessing any search data stored on the first storage system. Accordingly, the system may provide, to the first device and as a response to the third query, the third set of data retrieved from the first storage system.

Figure 6:
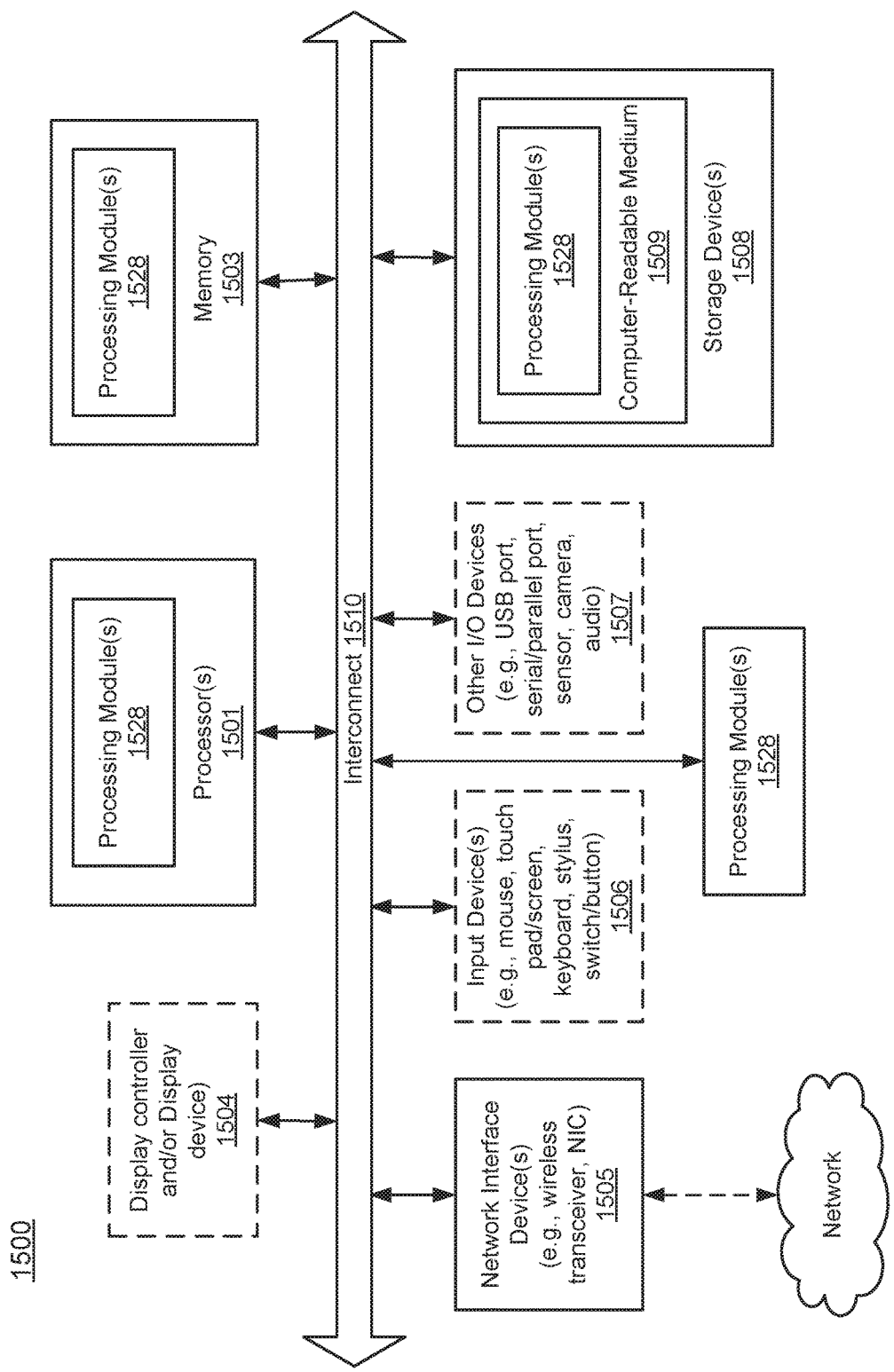
FIG. 6 is a block diagram illustrating an example computing system that may be used in conjunction with one or more embodiments of the disclosure.

FIG. 6 is a block diagram illustrating an example computing system that may be used in conjunction with one or more embodiments of the disclosure.

For example, system 1500 may represent any of data processing systems described above performing any of the processes or methods described above, such as, for example, one or more components shown in configuration 100 (e.g. system 100, client 101/102, application agent 106, storage system 104). System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the methods, processes, operations, functions, etc. as discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). For example, vehicle 101 may include an internal electronic display. In this regard, internal electronic display may be located within a cabin of vehicle. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-readable storage medium 1509 (or machine-readable storage medium, computer-accessible medium, etc.) on which is stored one or more sets of instructions or software (e.g. processing modules 1528) embodying any one or more of the methods, processes, operations, functions, etc. as described herein.

Processing modules 1528 (or component/unit/logic) may represent any of the components of configuration 100, such as, for example, application agent 106, deduplication logic 107, etc. Processing modules 1528 may also reside, completely or at least partially, within memory 1503 and/or within processor 1501 during execution thereof by system 1500, memory 1503, and processor 150, which may also constitute a computer-readable storage medium. In addition, processing modules 1528 can be implemented as firmware or functional circuitry within hardware devices. Further, processing modules 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures may be performed by processing logic that comprises hardware (e.g. circuitry, dedicated logic, etc.), firmware, software (e.g., embodied on a non-transitory computer-readable storage media), or a combination of both. Although the processes or methods are described above in terms of some sequential operations, it should be appreciated that some of the operations described may be performed in a different order. Moreover, some operations may be performed in parallel rather than sequentially.

The term "approximately" or "substantially" may be used herein and may be interpreted as "as nearly as practicable," "within technical limitations," and the like. In addition, the use of the term "or" indicates an inclusive "or" (e.g. "and/or") unless otherwise specified.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
receiving, from a first device, a first query for a first set of data stored on a first storage system;
performing a first search to fulfil the first query, wherein the first search includes accessing a first set of search data on the first storage system to identify and locate the first set of data, and retrieving the first set of data from the first storage system;
providing, to the first device and as a response to the first query, the first set of data retrieved from the first storage system;
storing the first set of search data in a cache of a second storage system;
receiving, from the first device, a second query for a second set of data stored on the first storage system;
performing a second search to fulfil the second query, wherein the second search includes
accessing the first set of search data stored in the cache of the second storage system to identify and locate a portion of the second set of data,
accessing a second set of search data stored on the first storage system to identify and locate a remaining portion of the second set of data, and
retrieving the second set of data from the first storage system;
providing, to the first device and as a response to the second query, the second set of data retrieved from the first storage system; and
storing the second set of search data in the cache of the second storage system.

2. The method of claim 1, further comprising:
receiving, from the first device, a third query for a third set of data stored on the first storage system;
performing a third search to fulfil the third query, wherein the third search includes
accessing the first set of search data stored in the cache of the second storage system to identify and locate a portion of the third set of data,
accessing the second set of search data stored in the cache of the second storage system to identify and locate a remaining portion of the third set of data, and
retrieving the third set of data from the first storage system, and wherein the third query is fulfilled without accessing any search data stored on the first storage system; and
providing, to the first device and as a response to the third query, the third set of data retrieved from the first storage system.

3. The method of claim 1, wherein the search data comprises one or more metadata files associated with the data.

4. The method of claim 3, wherein the metadata files are initially stored within a first directory tree on the first storage system, and at least a portion of the first directory tree stores only metadata files, and wherein the data is stored in data files within a second directory tree that is different from the first directory tree, and at least a portion of the second directory tree stores only data files.

5. The method of claim 4, wherein the search data further includes directory subspace information, wherein the directory subspace information provides a directory subspace name corresponding to the data required to fulfil each query.

6. The method of claim 5, wherein a mapping table for the directory subspace names is updated in response to storing search data in the cache.

7. The method of claim 1, wherein the data retrieved from the storage system is deduplicated data.

8. A non-transitory computer-readable medium storing instructions which, when executed by one or more processors of a computing device, cause the computing device to perform operations comprising:

receiving, from a first device, a first query for a first set of data stored on a first storage system;

performing a first search to fulfil the first query, wherein the first search includes accessing a first set of search data on the first storage system to identify and locate the first set of data, and retrieving the first set of data from the first storage system;

providing, to the first device and as a response to the first query, the first set of data retrieved from the first storage system;

storing the first set of search data in a cache of a second storage system;

receiving, from the first device, a second query for a second set of data stored on the first storage system;

performing a second search to fulfil the second query, wherein the second search includes accessing the first set of search data stored in the cache of the second storage system to identify and locate a portion of the second set of data, accessing a second set of search data stored on the first storage system to identify and locate a remaining portion of the second set of data, and retrieving the second set of data from the first storage system;

providing, to the first device and as a response to the second query, the second set of data retrieved from the first storage system; and storing the second set of search data in the cache of the second storage system.

9. The medium of claim 8, the operations further comprising:

receiving, from the first device, a third query for a third set of data stored on the first storage system;

performing a third search to fulfil the third query, wherein the third search includes accessing the first set of search data stored in the cache of the second storage system to identify and locate a portion of the third set of data, accessing the second set of search data stored in the cache of the second storage system to identify and locate a remaining portion of the third set of data, and retrieving the third set of data from the first storage system, and wherein the third query is fulfilled without accessing any search data stored on the first storage system; and providing, to the first device and as a response to the third query, the third set of data retrieved from the first storage system.

10. The medium of claim 8, wherein the search data comprises one or more metadata files associated with the data.

11. The medium of claim 10, wherein the metadata files are initially stored within a first directory tree on the first storage system, and at least a portion of the first directory tree stores only metadata files, and wherein the data is stored in data files within a second directory tree that is different from the first directory tree, and at least a portion of the second directory tree stores only data files.

12. The medium of claim 11, wherein the search data further includes directory subspace information, wherein the directory subspace information provides a directory subspace name corresponding to the data required to fulfil each query.

13. The medium of claim 12, wherein a mapping table for the directory subspace names is updated in response to storing search data in the cache.

14. The medium of claim 8, wherein the data retrieved from the storage system is deduplicated data.

15. A data processing system, comprising:

a memory storing instructions; and a processor coupled to the engine and the memory to execute the instructions from the memory, the processor being configured to perform operations, the operations comprising:

receiving, from a first device, a first query for a first set of data stored on a first storage system;

performing a first search to fulfil the first query, wherein the first search includes accessing a first set of search data on the first storage system to identify and locate the first set of data, and retrieving the first set of data from the first storage system;

providing, to the first device and as a response to the first query, the first set of data retrieved from the first storage system;

storing the first set of search data in a cache of a second storage system associated with the data processing system;

receiving, from the first device, a second query for a second set of data stored on the first storage system;

performing a second search to fulfil the second query, wherein the second search includes accessing the first set of search data stored in the cache of the second storage system to identify and locate a portion of the second set of data, accessing a second set of search data stored on the first storage system to identify and locate a remaining portion of the second set of data, and retrieving the second set of data from the first storage system;

providing, to the first device and as a response to the second query, the second set of data retrieved from the first storage system; and storing the second set of search data in the cache of the second storage system.

16. The system of claim 15, the operations further comprising:

receiving, from the first device, a third query for a third set of data stored on the first storage system;

performing a third search to fulfil the third query, wherein the third search includes accessing the first set of search data stored in the cache of the second storage system to identify and locate a portion of the third set of data, accessing the second set of search data stored in the cache of the second storage system to identify and locate a remaining portion of the third set of data, and retrieving the third set of data from the first storage system, and wherein the third query is fulfilled without accessing any search data stored on the first storage system; and providing, to the first device and as a response to the third query, the third set of data retrieved from the first storage system.

17. The system of claim 15, wherein the search data comprises one or more metadata files associated with the data.

18. The system of claim 17, wherein the metadata files are initially stored within a first directory tree on the first storage system, and at least a portion of the first directory tree stores only metadata files, and wherein the data is stored in data files within a second directory tree that is different from the first directory tree, and at least a portion of the second directory tree stores only data files.

19. The system of claim 18, wherein the search data further includes directory subspace information, wherein the directory subspace information provides a directory subspace name corresponding to the data required to fulfil each query.

20. The system of claim 19, wherein a mapping table for the directory subspace names is updated in response to storing search data in the cache.

* * * * *